(12) United States Patent
Masumoto et al.

(10) Patent No.: US 6,973,363 B2
(45) Date of Patent: Dec. 6, 2005

(54) METHOD FOR ASSISTING ANALYSIS OF PRODUCTION PROCESS, PROGRAM FOR MAKING COMPUTER EXECUTE THAT METHOD, PROGRAM PRODUCT, AND STORAGE MEDIUM

(75) Inventors: Daiki Masumoto, Kawasaki (JP); Yusuke Uehara, Kawasaki (JP); Susumu Endo, Kawasaki (JP); Shuichi Shiitani, Kawasaki (JP); Takayuki Baba, Kawasaki (JP); Shigemi Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/135,514

(22) Filed: May 24, 2005

(65) Prior Publication Data

US 2005/0222791 A1  Oct. 6, 2005

Related U.S. Application Data

(63) Continuation of application No. PCT/JP03/05635, filed on May 2, 2003.

(51) Int. Cl.[7] ............................................. G06F 19/00
(52) U.S. Cl. ......................................... 700/109; 702/84
(58) Field of Search ........................ 700/90, 108, 109, 700/110; 702/81, 84, 182, 183, 185

(56) References Cited

U.S. PATENT DOCUMENTS

| | | | | |
|---|---|---|---|---|
| 5,768,333 A | * | 6/1998 | Abdel-Mottaleb | ........... 378/37 |
| 5,790,690 A | * | 8/1998 | Doi et al. | ................... 382/128 |
| 6,092,059 A | * | 7/2000 | Straforini et al. | ............. 706/14 |
| 6,128,403 A | | 10/2000 | Ozaki | |

FOREIGN PATENT DOCUMENTS

| | | |
|---|---|---|
| JP | 11-31149 | 2/1999 |
| JP | 2000-354247 | 12/2000 |
| JP | 2001-306999 | 11/2001 |
| JP | 2002-323924 | 11/2002 |

OTHER PUBLICATIONS

"What is the Content-based Image Retrieval?" [Online] URL: <http://venus.netlaboratory.com/salon/chiteki/mur/imgsearch.html>.
Kohonen, "Jiko Soshikika Map", Springer-Verlag Tokyo Kabushiki Kaisha, (1996), all pages.

* cited by examiner

*Primary Examiner*—Zoila Cabrera
(74) *Attorney, Agent, or Firm*—Staas & Halsey LLP

(57) ABSTRACT

A method of assisting analysis of a production process assisting work for analyzing the relationship between quality factors and characteristic of a product and a program product and a recording medium for the same, comprising receiving a designation of a factor from a user at a computer, arranging images corresponding to said image data related to the received factor in a virtual space in a display device connected to the computer (S13), displaying the virtual space in which the images are arranged in the display device (S14), repeating the designation reception, arrangement, and display until the user judges that there is similarity between adjoining images in the displayed images, receiving designation of at least one image by the user from images having similarity between adjoining images (S15), automatically extracting common factors among factors of the designated image (S16), receiving a hypothesis of a relationship between the common factors designated by the user and quality of products, and verifying the relation hypothesis (S17) so as to thereby assist work for analyzing the relationship between factors selected by the user and the product characteristic and adding to factors feature quantity from the image data of products and feature quantity from text data relating to the process prepared by a production worker converted to numerals/characters (S11, S12).

21 Claims, 8 Drawing Sheets

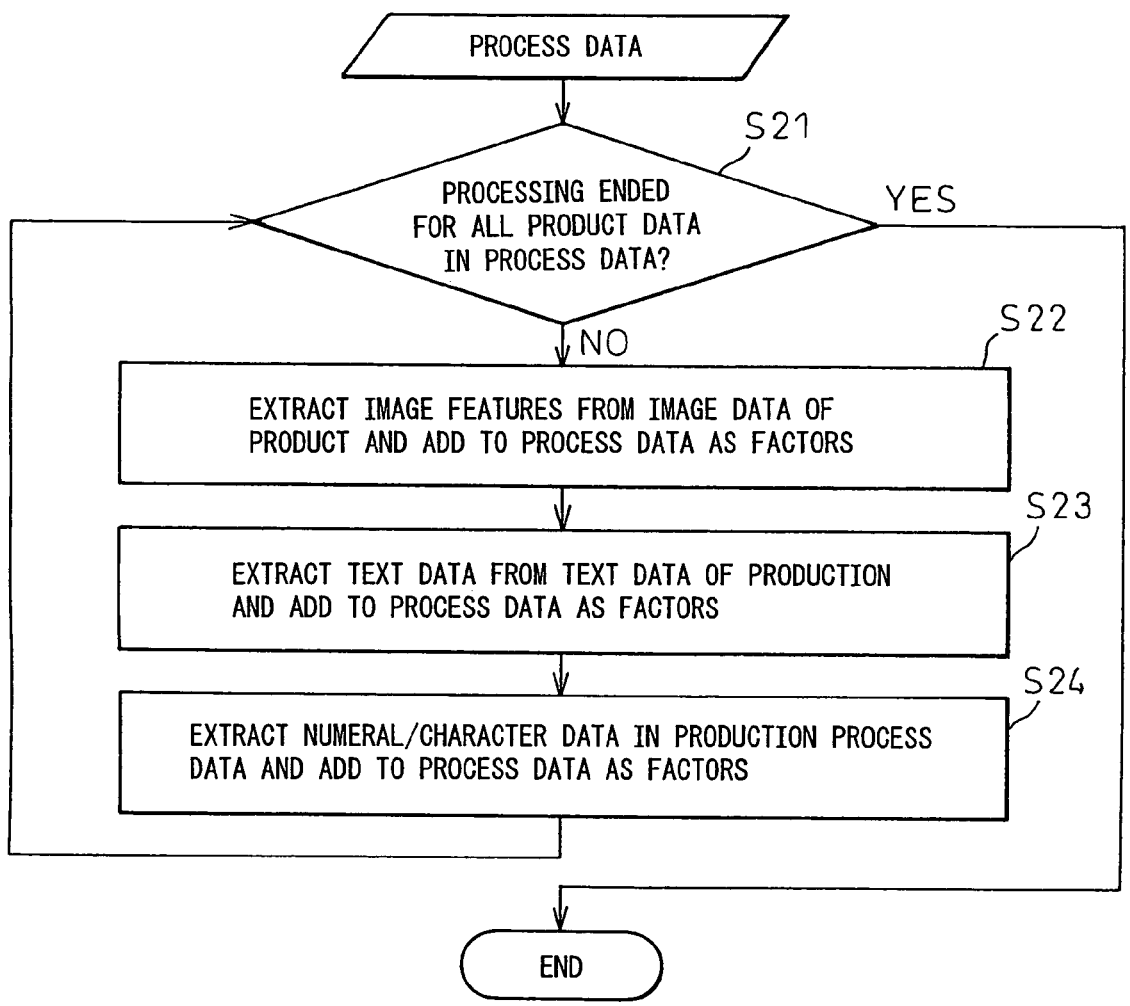

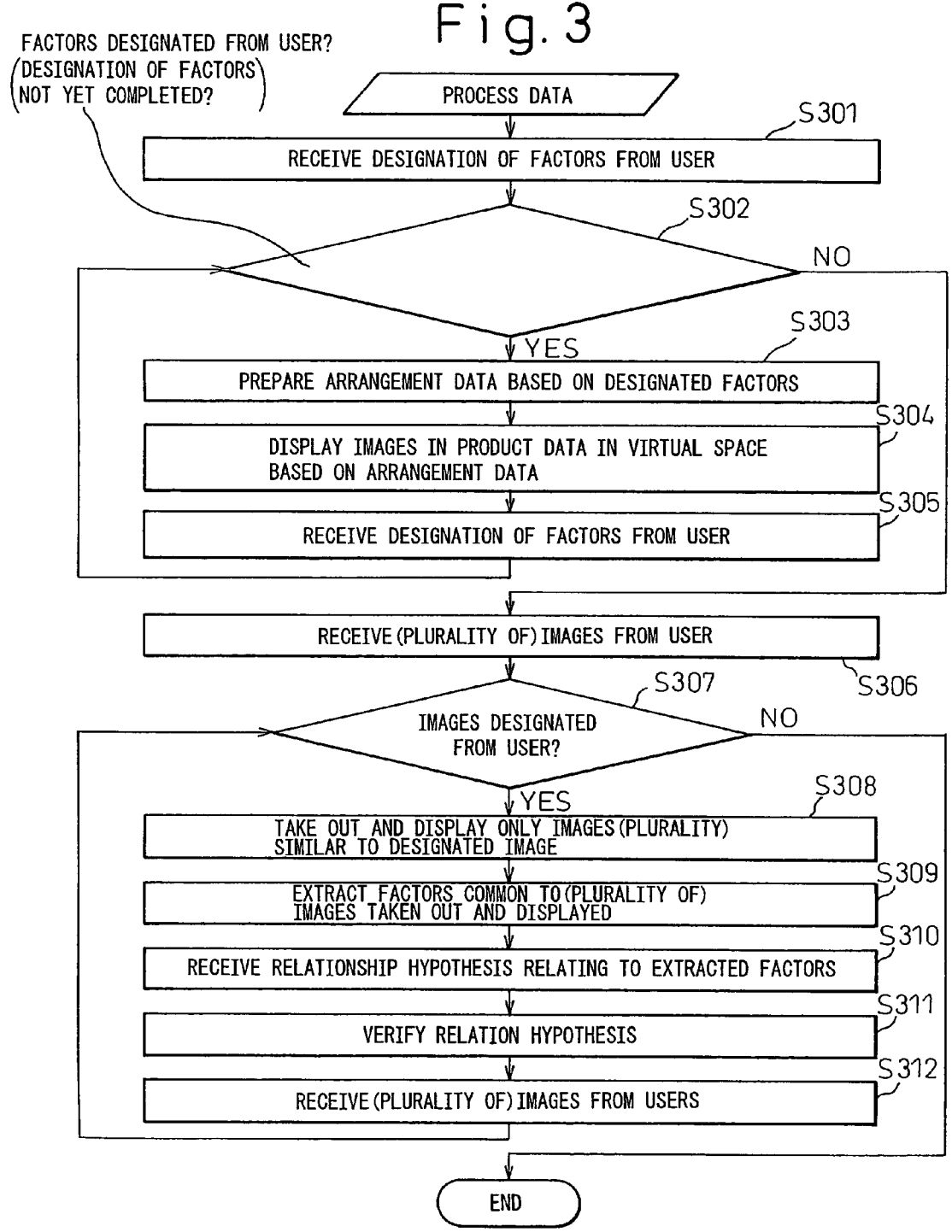

Fig. 4

PROCESS DATA

| PRODUCT NO. | FACTOR 1 | 2 | 3 | 4 | 5 | 6 | 7 | IMAGE 1 | COMMENT 1 |
|---|---|---|---|---|---|---|---|---|---|
| $P_1$ | 15cm | 2.1 m³/h | 0.43 kg/cm² | 21 mm | 50 % | 14 °C | 30 % | $I_1$ | $T_1$ |
| $P_2$ | 18cm | 4.6 m³/h | 0.34 kg/cm² | 34 mm | 45 % | 18 °C | 40 % | $I_2$ | $T_2$ |
| ⋮ | ⋮ | ⋮ | ⋮ | ⋮ | ⋮ | ⋮ | ⋮ | ⋮ | ⋮ |
| $P_N$ | 20cm | 3.3 m³/h | 0.21 kg/cm² | 32 mm | 46 % | 9 °C | 60 % | $I_N$ | $T_N$ |

S11: IMAGE FEATURE EXTRACTION ROUTINE

S12: TEXT FEATURE EXTRACTION ROUTINE

S13, S14: IMAGE ARRANGEMENT AND THREE-DIMENSIONAL VIRTUAL SPACE DISPLAY ROUTINE

S41: THREE-DIMENSIONAL VIRTUAL SPACE WALK THROUGH

S42: CHANGE ARRANGEMENT METHOD

S15: SIMILAR IMAGE SEARCH ROUTINE

S16: COMMON FACTOR EXTRACTION ROUTINE

S17: RELATIONSHIP VERIFICATION ROUTINE

Fig. 5

| COMMENT 1 | |
|---|---|
| $T_1$ | I HAD THE MUD WASHED OFF, BUT SOME MUDDY WATER REMAINED. I INSTRUCTED THAT IT BE WIPED AWAY BY A RAG. |
| $T_2$ | WE ENDED UP POURING THE CONCRETE ALL AT ONCE INTO THE FRAME, WHEREUPON THE SIDE PRESSURE BECAME TOO LARGE AND THE FRAME COULD NOT WITHSTAND IT |
| ⋮ | ⋮ |
| $T_N$ | 30 MINUTES AFTER STARTING THE POURING, IT BEGAN TO RAIN A BIT. WE COVERED THE PART FINISHED BEING POURED WITH A PLASTIC SHEET... |

METHOD FOR ASSISTING ANALYSIS OF PRODUCTION PROCESS, PROGRAM FOR MAKING COMPUTER EXECUTE THAT METHOD, PROGRAM PRODUCT, AND STORAGE MEDIUM

CROSS-REFERENCE TO RELATED APPLICATIONS

This application is a continuation of International Patent Application No. PCT/JP03/05635, filed on May 2, 2003, the contents being incorporated herein by reference.

TECHNICAL FIELD

The present invention relates to a method for assisting analysis of a production process able to be utilized for analysis of a production process for various types of industrial products in various industries, a program for making a computer execute this method, and a program product and storage medium, more particularly relates to a method for assisting analysis of a production process which assists analysis work of the relationship between factors which may influence the quality of products and the quality/characteristics when the characteristics of a finished product or the characteristics of an intermediate product (hereinafter referred to as a "product") are expressed as image data in the process of production of a semiconductor, the process of production of a magnetic disk device, the process of production of a display, etc. and a program, program product, and storage medium for the same.

BACKGROUND ART

In the processes for production of various industrial products, there are numerous factors which may influence the quality/characteristics of the products. The interaction of these factors is not well understood. As such factors, for example, there are the material characteristics, the apparatus, temperature, pressure, current, viscosity, speed, humidity, air pressure, etc. Among these factors, there are factors having parameters (control factors) able to be controlled from the outside and parameters which cannot be controlled (error factors). "Analysis of a production process" means the work for clarifying the relationship between these factors and product characteristics for the purpose of improving the quality of the products.

In the past, due to the difficulty in measuring the factors, production processes were analyzed based on the experience and intuition of skilled workers. In recent years, however, the improvement in performance of measuring instruments and data processing devices has made it possible to easily obtain data relating to these factors or product characteristics. Therefore, as an approach for analyzing a production process systematically without relying on experience or intuition, multivariate analysis and other statistical techniques (see Takao Maruyama and Masaya Miyakawa, SQC Theory and Practice, Series "Mathematical Principles for the Contemporary Man", Asakura Shoten (1992)) and data mining techniques are being used for process analysis in an increasing number of cases (see Hidetaka Tsuda, Hideo Shirai, and Riichiro Take, "Application of Data Mining to Yield Analysis", 3 rd *Data Mining Workshop Papers, Japan Society of Software Science Data Mining Research Group* (2002) and Michael J. A. Berry and Gordon Linoff, *Mastering Data Mining*, John Wiley & Sons Inc. (2000)).

In the conventional methods of analysis of production processes using factor analysis or other statistical techniques or data mining technology, the extents of the influence of explanatory variables on a criterion variable are statistically analyzed using various factors as explanatory variables and using an indicator of quality as a criterion variable. However, this has the following problems:

(a) The data obtained in a production process often includes several hundred to several thousand of factors, while the number of records which correspond to the number of lots is generally small. Therefore, with just the conventional statistical techniques, it is difficult to obtain significant results if the number of records is small.

(b) Even if image data expressing characteristics of a finished product or characteristics of an intermediate product or text data relating to the process such as comments of a production worker are obtained in a production process, these are only treated as reference data and cannot be directly utilized for process analysis. For example, sometimes a production worker will view the appearance of an intermediate product or finished product and intuitively judge what parts of the process are in what states based on his previous experience, but this type of analysis is not possible with conventional statistical techniques.

(c) An inspector can visually inspect a product or utilize image recognition technology to convert appearance to numerical features for statistical process analysis. However, converting slight changes in appearance to numerical features is difficult and the conversion may cause a loss of the information for process analysis.

Nonpatent Documents

[1] Takao Maruyama and Masaya Miyakawa, SQC Theory and Practice, Series "Mathematical Principles for the Contemporary Man", Asakura Shoten (1992)

[2] Hidetaka Tsuda, Hideo Shirai, and Riichiro Take, "Application of Data Mining to Yield Analysis", 3 rd *Data Mining Workshop Papers*, Japan Society for Software Science and Technology Data Mining Research Group (2002)

[3] Michael J. A. Berry and Gordon Linoff, *Mastering Data Mining*, John Wiley & Sons Inc. (2000)

[4] Kohei Murao, "Automatic Extraction of Image Feature Quantities and Similar Image Search", *Humanities and Data Processing*, vol. 28, pp. 54 to 61, Bensei Shuppan, July (2000).

[5] Vittorio Castelli and Lawrence D. Bergman ed.; *Image Databases: Search and Retrieval of Digital Imagery*, pp. 285 to 372, John Wiley & Sons (2002).

[6] Nishio et al., *Data Structuring and Searching*, pp. 113 to 119, Iwanami Shoten (2000).

[7] Haruo Yanagii, *Multivariate Data Analysis Methods—Theory and Application*, Asakura Shoten (1994).

[8] Kohonen (translated by Takaya Toku): *Self Organization Map*, Springer Verlag Tokyo (1996).

DISCLOSURE OF INVENTION

An object of the present invention is to solve the above problems of the conventional methods of analysis of production processes by providing a method of assisting analysis of a production process based on the idea of arranging and displaying images based on selected factors, then reselecting factors and rearranging images until adjoining images of a plurality of products become similar, after that automatically extracting factors common to designated adjoining images, which assists the streamlining of work for analysis of the relationship between factors and quality/ characteristics without relying only on statistical techniques even when the number of records of products is small and a program, program product, and storage medium for the same.

Another object is to provide a method of assisting analysis of a production process assisting the streamlining of the work for analysis of the relationship between factors and quality/characteristics even if the person analyzing the production process is not a skilled worker and a program and storage medium for the same.

Still another object is to provide a method of assisting analysis of a production process for assisting streamlining of work for analyzing the relationship between factors and quality/characteristics by making an image of a product or text relating to the process prepared by a production worker part of the factors converted to numerals/characters and a program, program product, and storage medium for the same.

To achieve the above objects, according to a first aspect of the present invention, there are provided a method of assisting analysis of a production process assisting work for analyzing the relationship between a factor which may influence the quality of a product in a production process and which is comprised of numeral/character data and a quality/ characteristic of a product and a program, program product, and storage medium storing the program. This method is provided with an arrangement routine arranging images based on designated factors received from a user, a display routine displaying images based on the arrangement in a virtual space in a display device, a routine repeating reception of designation of a factor from a user until the user judges that there is similarity between adjoining images in the displayed images, an image designation reception routine receiving designations of a plurality of images by the user from images having similarity between adjoining images, a common factor extraction routine automatically extracting common factors among factors of designated images, a relation hypothesis reception routine receiving a hypothesis of a relationship between a factor and a quality of products, and a routine verifying the relation hypothesis. Due to this, the work of a user analyzing the relationship between selected factors and quality/characteristic is assisted.

According to the first aspect, an assisting environment is provided enabling a person conducting an analysis to perform analysis with the inclusion of his knowhow and experience while viewing data, so the small number of records is made up for.

Specifically, the image data is made to be able to be directly handled by process analysis, so a user (that is, a person analyzing the production process) can view images or rearrange the images based on various viewpoints and thereby the proposal of a hypothesis relating to the relationship between factors which may influence the quality of products and the quality/characteristic of products is assisted. Further, it becomes easy to perform the verification work for confirming to what extent a proposed hypothesis is reliable.

Further, in the first aspect, preferably there is further provided a routine extracting from image data and text data relating to the process prepared by a production worker and expressing a quality/characteristics of products feature quantities of the same converted to numerals/characters and adding them to the factors, and the common factor extraction routine includes a routine extracting at least one of the image features, words, and factors common to selected images.

Due to this, it is possible to simply extract features common to images or text, so analysis of the production process of products becomes easier.

Further, in the first aspect, the designated image reception routine may include a routine receiving specific images designated by a user in a virtual space, and the display routine may include a routine listing up and displaying on a display means images similar to the designated image when a user designates at least one of feature quantity or numeral of a designated image and text data.

Due to this, images similar to a designated image can be easily extracted, so analysis of the production process of products becomes easier.

Further, in the first aspect, the routine verifying a hypothesized relationship may include a routine verifying a relationship between a factor and a quality/characteristics which a user finds.

Due to this, the relationship between a factor and a quality/characteristics can be reliably grasped.

Further, in the first aspect, the arrangement routine may include a routine utilizing a self-organizing map.

Due to this, it is possible to display an image corresponding to four dimensions or more of factors in a three-dimensional space, whereby analysis of the production process of products becomes easier.

Further, in the first aspect, the display routine includes a routine changing a viewing point in a virtual space so as to assist the work of viewing an image in a virtual space.

Due to this, it is possible for a user to freely view the inside of the virtual space, so he can easily obtain a grasp of the relationship between a desired factor and the quality/ characteristics.

Further, in the first aspect, the display routine may include a routine displaying a virtual space at a display device connected to another computer through a network.

Due to this, it is possible to display the virtual space at any location utilizing a network in a client-server relationship.

BRIEF DESCRIPTION OF DRAWINGS

These objects and features of the present invention will become clearer from the best modes for working the invention described below with reference to the drawings.

FIG. 2 is a flow chart explaining a method of extracting feature quantities converted to numerals/characters from images and text in process data shown in FIG. 1.

FIG. 3 is a flow chart explaining details of a method of assisting analysis of a production process according to an embodiment of the present invention.

FIG. 4 is a flow chart explaining a specific example of a method of assisting analysis of a production process according to an embodiment of the present invention.

FIG. 5 is a view of an example of comments shown in FIG. 4.

BEST MODE FOR CARRYING OUT THE INVENTION

Figure 1:
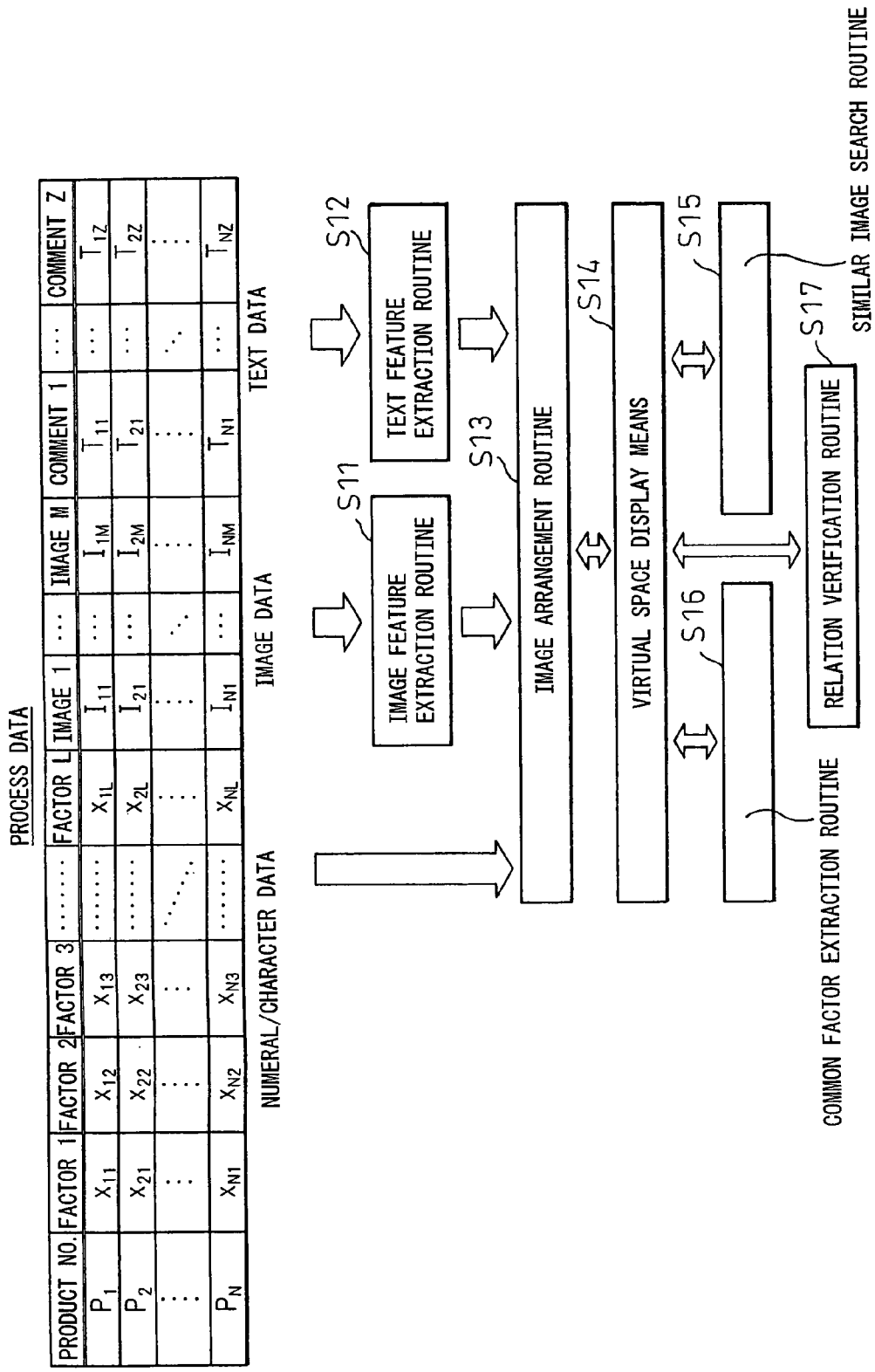
FIG. 1 is a flow chart explaining in brief the method of assisting analysis of a production process according to an embodiment of the present invention.

FIG. 1 is a flow chart explaining in brief the method of assisting analysis of a production process according to an embodiment of the present invention. In the figure, the process data comprises the factors 1 to L which may influence the quality of products in a production process of products, product images 1 to M, and comments (text data) 1 to Z relating to the process prepared by a production worker in the production process of products assigned to Product Nos. $P_1$ to $P_N$.

In the illustrated example, the numeral/character data of the factors 1 to L of Product No. $P_1$ are X11 to X1L, the images are $I_{11}$ to $I_1M$, and the comments are $T_{11}$ to $T_{1z}$. The numeral/character data of the factors 1 to L of Product No. $P_2$ are $X_{21}$ to $X_{2L}$, the images are $I_{2L}$ to $I_{2M}$, and the comments are $T_{21}$ to $T_{2z}$. The numeral/character data of the factors 1 to L of Product No. PN are XN1 to XNL, the images are $I_{N1}$ to $I_{NM}$, and the comments are $T_{N1}$ to $T_{NZ}$.

The images of the products are stored as image data in a storage device of a computer, while the comments are stored as text data in the storage device of the computer.

<Image Feature Extraction Routine S11>

At step S11, features are extracted from the image data of the images and converted to numerals/characters according to the present invention. The "numerals/characters" in the following description means a set of symbols comprised of at least one of the numerals/characters. As image features extracted, color features, texture features, frequency features (fourier features or DCT features), and shape features (see above-mentioned Nonpatent Documents 4 and 5). Further, it is also possible to automatically divide the images into pluralities of regions (segmentation) and extract the image features corresponding to the individual regions or have a specific region designated by the user and extract the image features corresponding to that region.

<Text Feature Extraction Routine S12>

Similar, at step S12, features are extracted from the text data of the comments and converted to numerals/characters according to the present invention. The text features are extracted as follows. First, a set of words believed to be effective for characterizing the text is selected in advance. The tf-idf (term frequency-inverse document frequency) method is used to measure the relative importance of each word. These are listed to extract a vector having the t-idf values of the words as elements from the text data (see Nonpatent Document 6).

The image data converted to numerals/characters and the text data converted to numerals/characters are added to the process data as factors other than factors 1 to L.

The process data is displayed on a display device connected to a computer. A user designates at least one factor in the displayed process data by clicking on it by the mouse. That is, the user designates at least one factor among the image features, text features, and the factors 1 to L of the product for each product. The computer receives the designation of the factors.

<Image Arrangement Routine S13>

Next, at step S13, the computer arranges the image data of the products in a virtual space of up to three dimensions in accordance with the designations. The numeral/character data expressing the factors including image features and text features are generally higher dimension vectors. With this, arrangement in a virtual space of three dimensions or less would be impossible. Therefore, to determine the arrangement of images in for example a three-dimensional virtual space, there is the method of selecting three numerals/characters from the numerical/word data of the products and assigning them to three orthogonal coordinate axes set in the space. Further, there is also the method of compressing image features, text features, and numerical/word data to three dimensions by principal component analysis, multidimensional scaling analysis, or another statistical technique (see Nonpatent Document 7). Further, it is also possible to use a self organizing map (SOM)—a type of neural network (see Nonpatent Document 8).

<Virtual Space Display Routine S13>

Next, at step S14, the virtual space in which the images are arranged is actually displayed on the display device. The images can be displayed by utilizing computer graphic technology so that the user can change his viewing point in the virtual space or walk freely through the virtual space (walk through) or fly around it (fly through). This assists the work of viewing a large number of images or narrowing down to some images or zooming into a specific image and examining it in detail.

Further, it is also possible to display the virtual space in another device through a network. In this case, the images are transferred through a client-server network.

Further, a user can utilize an image arrangement routine while moving through the virtual space. Specifically, he can extract new types of features or change the method of assignment of numerals/characters to the coordinate axes or change the types of features for arrangement of the images. Due to this, it becomes possible to assist the work of the user comparing image data from various viewing points and finding the relationships between the various factors and patterns of the image data.

The user repeats the designation reception routine, the arrangement routine, and the display routine until the user judges that there is similarity between adjoining images in the displayed images while moving through the virtual space.

<Similar Image Search Routine S15>

Next, at step S15, the user uses a mouse or keyboard to select similar images or designate the range of adjoining similar images from the images displayed in the virtual space. Further, the user may also select a specific image by a mouse or keyboard or designate a feature or numeral/character data to be noted in the images so as to list up and display similar images. Due to this, it becomes possible to assist the work of a user comparing image data from various viewing points and finding the relationship between the various factors and patterns of the image data.

<Common Factor Extraction Routine S16>

Further, at step S16, the user can select a plurality of images by the mouse or keyboard in the virtual space and further designate the type of feature to be noted and the numeral/character data to extract image features, words, and factors common to the products corresponding to the images. Due to this, it becomes possible to assist the work of finding the relationship between the factors and features used for the arrangement and the extracted image features, words, and factors.

<Relation Verification Routine S17>

Finally, at step S17, the method verifies the "relationship between factors and quality/characteristics" found by the user (person analyzing process) by the above routine. For example, when finding the rule that "when a certain factor is in a specific range, a quality/characteristic tends to fall in a certain range" as this relationship, the method checks whether this rule stands or not for a large amount of data to quantitatively verify the appropriateness of the rule. Further, when finding the rule that "a certain factor and quality/characteristic have correlation", it checks to what extent this relationship stands for a large amount of data to quantitatively verify the appropriateness of the relationship found.

According to the present invention, there are also provided a program for making a computer execute this method, a program product, and a storage medium storing this program.

Note that the program and program product in the present specification include a program and program product distributed through a network and a program and program product stored in a storage medium.

FIG. 2 is a flow chart explaining a routine adding image features and text features as factors in the process data shown in FIG. 1. In the figure, at step S21, it is judged if the processing for extraction of image features and text features has been completed for all product data in the process data. If not completed, at step S22, image features are extracted from the image data of one product and added to the process data as factors.

Next, at step S23, text features are extracted from the text data of the product and added to the process data as factors.

Next, at step S24, numeral/character data of the product in the process data are extracted and added to the process data as factors.

Next, the routine returns to step S21, where it is judged if the processing for extraction of image features and text features for all product data in the process data has been completed. If not completed, steps S22 to S24 are repeated. If completed, the routine for adding factors to the process data is ended.

Note that the processing shown in FIG. 2 is not processing essential in the present invention.

FIG. 3 is a flow chart explaining details of a method of assisting analysis of a production process according to an embodiment of the present invention.

In the figure, at step S301, the computer receives designation of factors in the process data from the user by a mouse or keyboard.

Next, at step S302, it is judged if the designation of factors has ended. If there is no further designation of a factor from the user, the processing is ended.

If a factor is designated, the routine proceeds to step S303 where data of arrangement in a virtual space in the computer is prepared based on the designated factors.

Next, at step S304, the images in the product data are displayed in the virtual space based on the arrangement data prepared at step S303. At step S305, designation of factors from a user is received. The routine then returns to step S302, whereupon step S303 to step S305 are repeated until the user judges that there is similarity between the adjoining images. The above operation is the detailed operation from step S11 to S14 in FIG. 1.

Next, at step S306, designation of a plurality of images is received by mouse operation or keyboard operation of the user.

Next, at step S307, it is judged if images have been designated from the user. If not, the processing is ended.

If images have been designated, at step S308, the computer automatically takes out and displays only the plurality of images similar to the designated images.

Next, at step S309, the computer automatically extracts subsets of factors common to the images taken out and displayed from the factors designated by the user.

Next, at step S310, the computer receives a hypothesis prepared by the user relating to the relationship between a factor designated by the user and the quality of the products.

Next, at step S311, the computer displays and compares the related images so that the user can verify the relation hypothesis received.

Next, at step S312, the computer again receives designation of at least one image by the user, judges if an image has been designated from the user at step S307, and, if there is designation, repeats steps S308 to S311.

FIG. 4 is a flow chart explaining a specific example of a method of assisting analysis of a production process according to an embodiment of the present invention.

In the figure, routines the same as in FIG. 1 are assigned the same reference numerals.

In this specific example, the method assisting analysis of a production process covering analysis of the process of "pouring concrete" comprising creating a box-shaped structure at the base part or wall part of a building, pouring concrete into it, and utilizing the properties of concrete for cure it. Here, the objective is to beautify the appearance after pouring and reduce variations due to error factors.

The flow of processing of this specific example is as follows:

(1) Acquisition of Data

As the control factors, the following five factors are used:

Factor 1: Slump (indicator of extent of softness of still not yet solidified concrete), unit: cm Factor 2: Pouring speed, unit: $m^3/h$ (time)

Factor 3: Pouring stopping pressure, unit: $kg/cm^2$

Factor 4: Maximum aggregate size, unit: mm

Factor 5: Fine aggregate ratio, unit: %

Further, it is learned that the ambient conditions of the pouring site influence the finished product, so these are designated as error factors.

Factor 6: Air temperature, unit: ° C.

Factor 7: Humidity, unit: %

The image data was as follows:

Image 1: Image of appearance after pouring (for simplification of the illustration, the greater the number of hatching lines in the image, the darker the color of the image. In actuality, the influence of muddy water during the pouring, the influence of the speed of pouring the concrete, the influence of rain, etc. are reflected in the image).

The text data was as follows:

Comment 1: Sentence describing results of observation during pouring

FIG. 5 is a view showing part of an example of Comments $T_1, T_2, \ldots T_N$ corresponding to the product nos. In the figure, the Comment $T_1$ of Product No. $P_1$ is "I had the mud washed off, but some muddy water remained. I instructed that it be wiped away by a rag". Further, the Comment $T_2$ of Product No. $P_2$ is "We ended up pouring the concrete all at once into the frame, whereupon the side pressure became too large and the frame could not withstand it". Further, the Comment $T_N$ of Product No. $P_N$ is "30 minutes after starting the pouring, it began to rain a bit. We covered the part finished being poured with a plastic sheet . . . "

The image feature extraction routine for extracting feature quantities converted to numerals/characters from image data of step S11 in FIG. 4 is as follows:

(A) Extraction of Color Distribution Feature (see Nonpatent Document 5)

1) The pixel values of the image data are converted from expressions in an RGB color space (r, g, b) to expressions in an HSI color space (h, s, i).

2) The HSI space is divided into N_h (number of divisions in H-axis)×N_s (number of divisions in S-axis)×N_i (number of divisions in I-axis)=N number of blocks and the numbers of pixels included in the individual blocks are counted. The results are listed and converted to an N-dimension vector. This is made the feature quantity.

(B) Extraction of Wavelet Feature (see Nonpatent Document 2)

1) The image data is converted to wavelets.

2) The wavelet conversion coefficients obtained as a result are separated into large shape parts of the image and fine pattern parts, contour parts, etc.

3) These are combined to obtain a vector. This is used as the feature quantity.

The wavelet conversion is conversion by spatial frequency conversion while storing the positional information of the images. The shapes of the objects on images can be described compactly. Images of different sizes can be compared with the same scale.

(C) Extraction of Edge Direction Histogram (see Nonpatent Document 4)

1) The edges are extracted from the image data by a Sobel filter etc.

2) The directions of the extracted edges are made discrete and the frequency counted for each direction.

3) The values obtaining by division by the number of edges of the image as a whole are arranged to make a vector. This is used as the feature quantity.

In addition, it is possible to extract fourier features, DCT features, texture features, and various other image features from image data and utilize them in the form of vectors.

The text feature extraction routine for converting the feature quantities into numerals/characters from the text data of step S12 of FIG. 4 is performed by a method such as the one explained below (see Nonpatent Document 6).

1) First, words are extracted from the text data.

2) The tf-idf (term frequency—inverse document frequency) method is used to measure the relative importance of each word and list up the same. A vector having the tf-idf values of the words as elements is obtained from the text. This is used as the feature quantity.

The image arrangement and three-dimensional virtual space display routines of steps S13 and S14 of FIG. 4 are performed by the following method.

Figure 6:
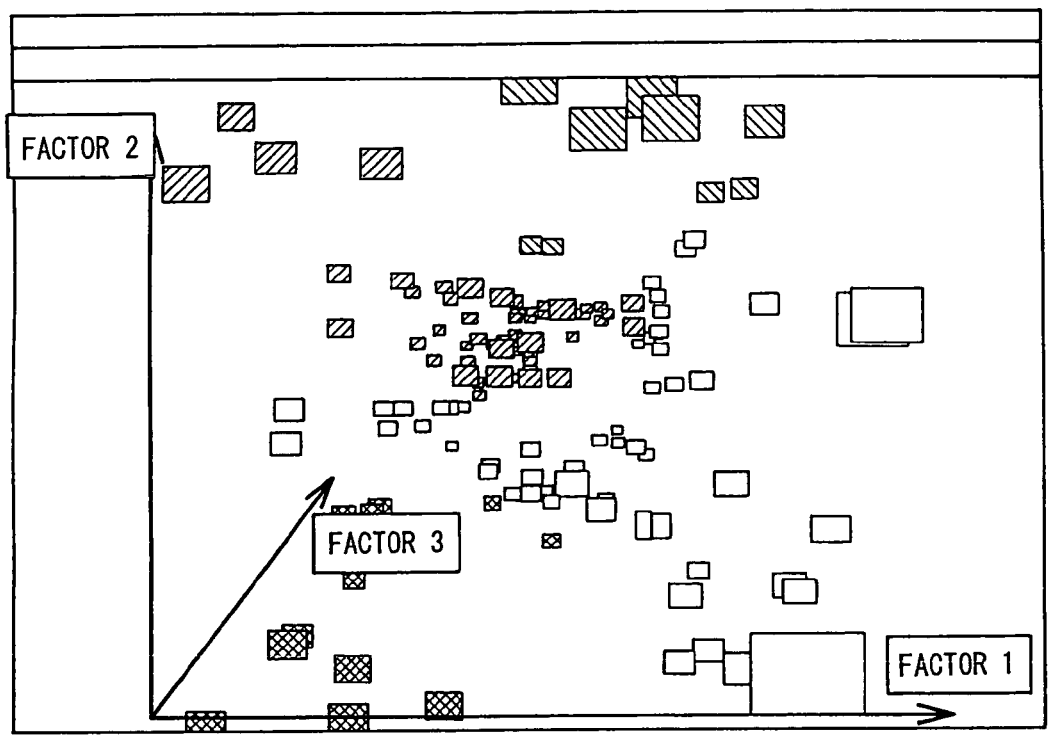
FIG. 6 is a view of an example of a screen including images displayed in a virtual space in the case where a user selects any three factors in the specific example of FIG. 4.

FIG. 6 is a view showing a virtual space displayed in a display device when selecting three numerals/characters from the numeral/character data of the factors 1 to 7, images 1 to M, and comments 1 to Z and assigning them to the three orthogonal coordinate axes set in the virtual space. The user selects three numerals/characters in the numeral/character data of the factors including the images and comments and assigns them to the three orthogonal coordinate axes set in the virtual space. For example, the user selects the factor 1 (slump), factor 5 (fine aggregate ratio), and factor 6 (temperature) and assigns these to the axes. By using the virtual space display means, the image data of the products are arranged in the virtual space and displayed on a display device connected to a computer.

Figure 7:
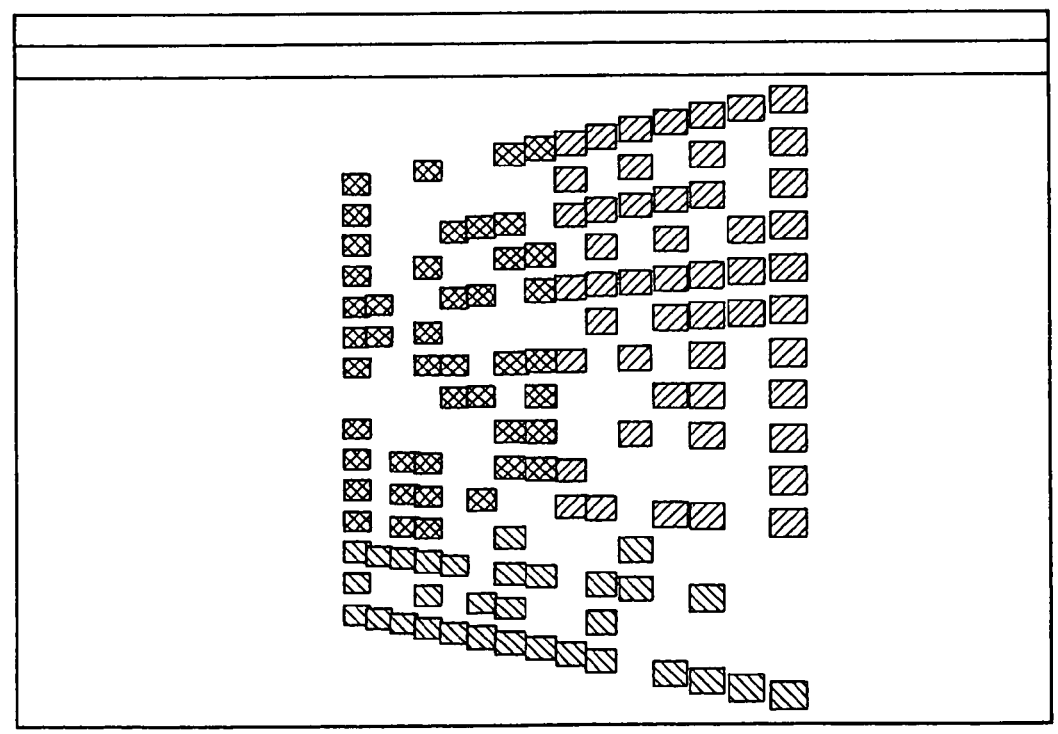
FIG. 7 is a view of an example of a screen displaying images in a three-dimensional virtual space using a self-organizing map from four or more dimensions of factors in the specific example of FIG. 4.

FIG. 7 is a view of an example of a screen displaying images in a three-dimensional virtual space using a self-organizing map from four or more dimensions of factors in the specific example of FIG. 4.

In the case of text feature or image feature, a self organizing map (SOM) (see Nonpatent Document 8) is used to enable images to be arranged on a three-dimensional virtual space or two-dimensional virtual space (plane) and enable images with similar features of these images to be arranged gathered close together. The self organizing map is a type of neural network based on a competitive learning model and transfers the data in a higher dimensional space to a lower dimensional space. At this time, it is possible to arrange data close in distance in the higher dimensional space as close as possible in the lower dimensional space as well. The SOM processing is divided into two phases: a learning phase and an arrangement phase. In the learning phase, cells are arranged regularly on a virtual space, then vector values assigned to the cells are updated based on input. As a result of the learning, the cells at close positions have similar vector values. The arrangement phase is performed by arrangement at positions of cells having the closest vector values to the vector value covered by the arrangement based on the learning results. With this invented method, the SOM processing is performed for different types of features using sets of information for arrangement and the results of arrangement are held.

The virtual space display routine is used to arrange the image data of the products in the virtual space and display it on a display device connected to a computer.

From the image data, the color distribution feature (ex. HSV: Hue Saturation Value, vector obtained by dividing color space divided into bins, dividing the numbers of pixels contained in the individual bins by the number of pixels of the image as a whole), the texture feature showing the degree of fineness (vector obtained by weighting wavelet conversion coefficient), frequency feature showing regularity (fourier feature or DCT feature), and shape factor showing cracks etc. (vector obtained by extracting edges from image, making directions of the same discrete, counting the frequency, dividing the result by the number of edges of the image as a whole) are extracted (see Nonpatent Documents 4 and 5).

In the virtual space shown in FIG. 6 or FIG. 7, as shown in step S41 in FIG. 4, it is possible to walk through the three-dimensional virtual space. That is, the user can change the viewing point by operation of the mouse in the three-dimensional virtual space displayed to search for desired images and thereby search for information. By clicking on an image, it is also possible to access detailed information of the product corresponding to that image.

Further, in the virtual space shown in FIG. 6 or FIG. 7, as shown in step S42 in FIG. 4, it is possible to change the method of arrangement of the images. That is, by switching the factors assigned to the axes for the display, it is possible to classify and arrange the images from various viewpoints. For example, it is possible to select a text feature as the feature for arrangement and arrange the images for display using the same. Further, it is possible to input some sort of keywords and change the arrangement of the corresponding images for display so that the images are closer to the viewing point of the user the better the extent by which text attributes included in comments on the products match with the keywords. This operation is repeated until the user judges that there is similarity between adjoining images.

Figure 8:
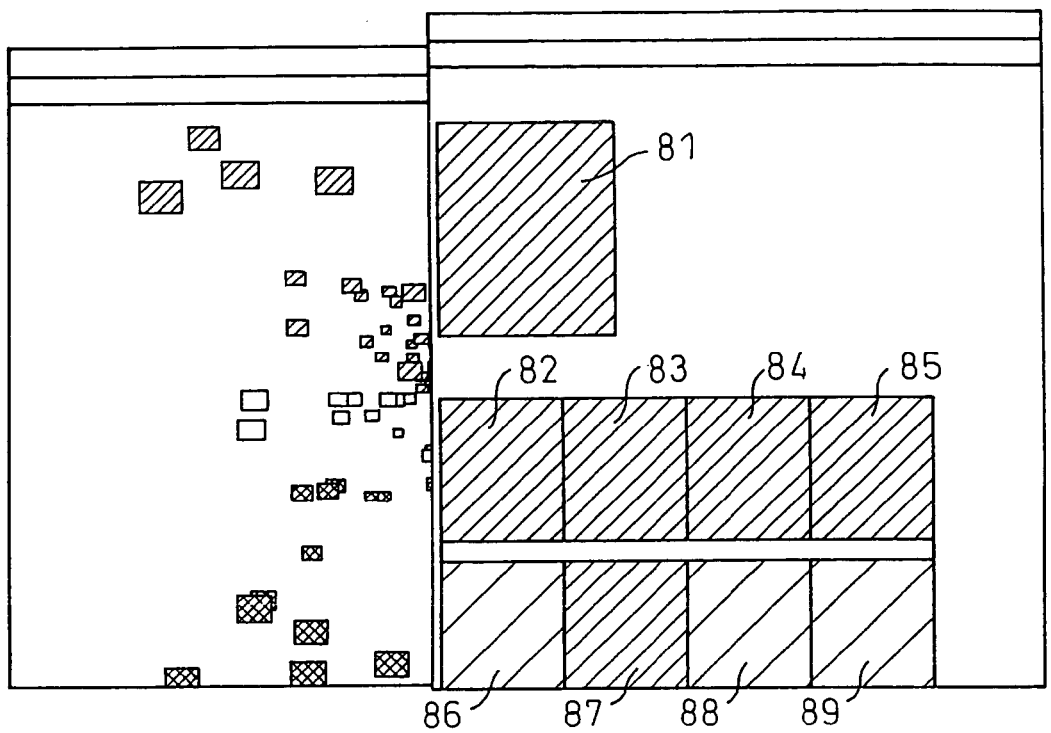
FIG. 8 is a view of a screen listing up and displaying images similar to a single image selected by a user in the specific example of FIG. 4.

FIG. 8 is a view of a screen listing up and displaying images similar to a single image selected by a user in the specific example of FIG. 4. In this figure by selecting a specific image 81 in the virtual space and further designating feature quantity or numeral/character data to be noted, it is possible to list up and display the similar images 82 to 89. Due to this, it becomes possible to assist the work of the user comparing the image data from various viewing points and discover a relationship between various factors and patterns of the image data.

Figure 9:
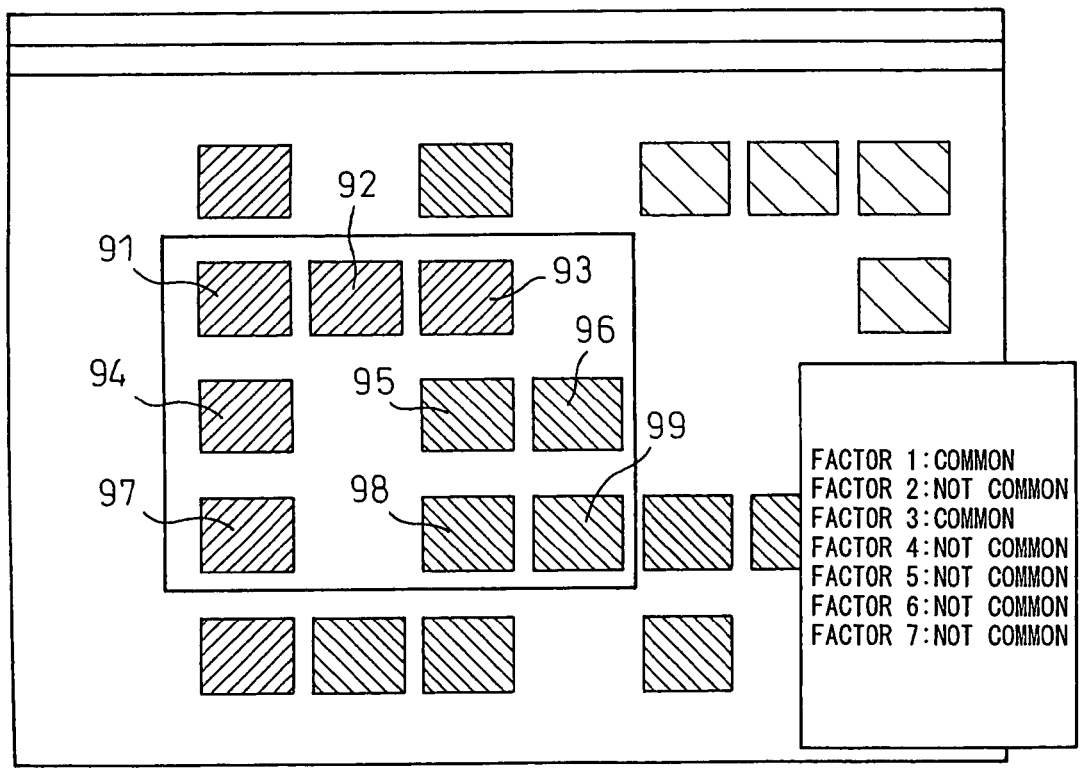
FIG. 9 is a view of a screen displaying images having common factors selected by a user in the specific example of FIG. 4.

FIG. 9 is a view of a screen displaying images having common factors selected by a user in the specific example shown in FIG. 4. In the figure, by selecting a plurality of images in a virtual space where adjoining images appear to have similarity and further designating feature quantities or numeral/character data to be noted, it is possible to extract factors, words, or image features common to the products corresponding to these images. Due to this, it becomes possible to assist the work of finding the relationship between factors or feature quantities used for the arrangement and the factors, words, and image features extracted. For example, as shown in FIG. 9, if using the factors 1 to 7, image 1, and comment 1 for arrangement, it is possible to extract common factors by the following routine:

The factors 1 to 7, image 1, and comment 1 are arranged to a nine-dimensional vector to form a two-dimensional self organizing map (plane in three-dimensional space).

The learned self organizing map is used to arrange the images in a virtual three-dimensional space.

The user views the virtual three-dimensional space and finds locations where images having a certain common property are gathered and locations where they are arranged with regularity. For example, in FIG. 9, images 91 to 99 with a certain color unevenness are gathered together. These images are selected by surrounding them by a desired color frame.

An apparatus compares the distribution of the factors in the images as a whole and calculates if the distribution of the factors of the images selected are biased. The biased ones are extracted as common factors. In FIG. 9, the factor 1 and factor 3 are extracted as candidates for common factors.

In this way, the rule for example that "if the slump of FIG. 1 is 16±1 cm, color unevenness easily occurs" can be discovered.

Figure 10:
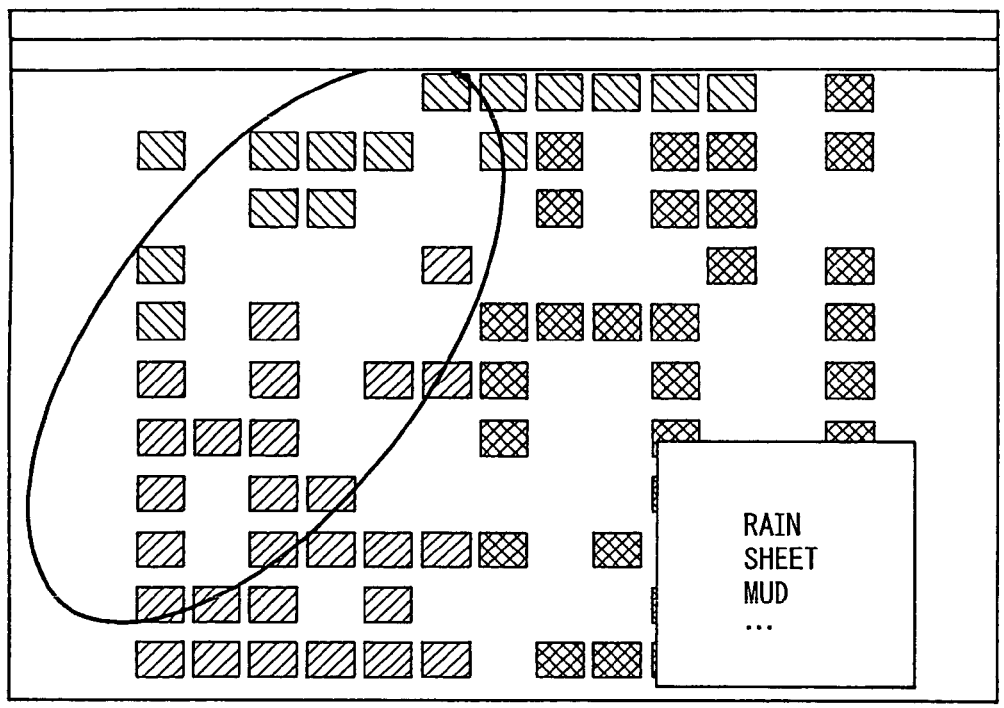
FIG. 10 is a view of a screen where common image features are extracted by a user in the specific example of FIG. 4.

FIG. 10 is a view of a screen where common text is used for extraction by a user in the specific example shown in FIG. 4.

If using a text feature for arrangement, for example, it is possible to extract common factors as follows:

A text feature is used to form a self-organizing map.

The learned self organizing map is used to arrange images in a virtual three-dimensional space.

The user views the virtual three-dimensional space and finds locations where images having a certain common property are gathered and locations where they are arranged with regularity. For example, in FIG. 1, images of blue colors are gathered together. The user selects these images surrounded by a yellow frame. In FIG. 10, "rain", "sheet", "mud", and other words in comments are extracted as candidates for common words.

As a rule, "if covering by a sheet due to rain or if the ground becomes muddy, a blue color easily appears" can be found.

Figure 11:
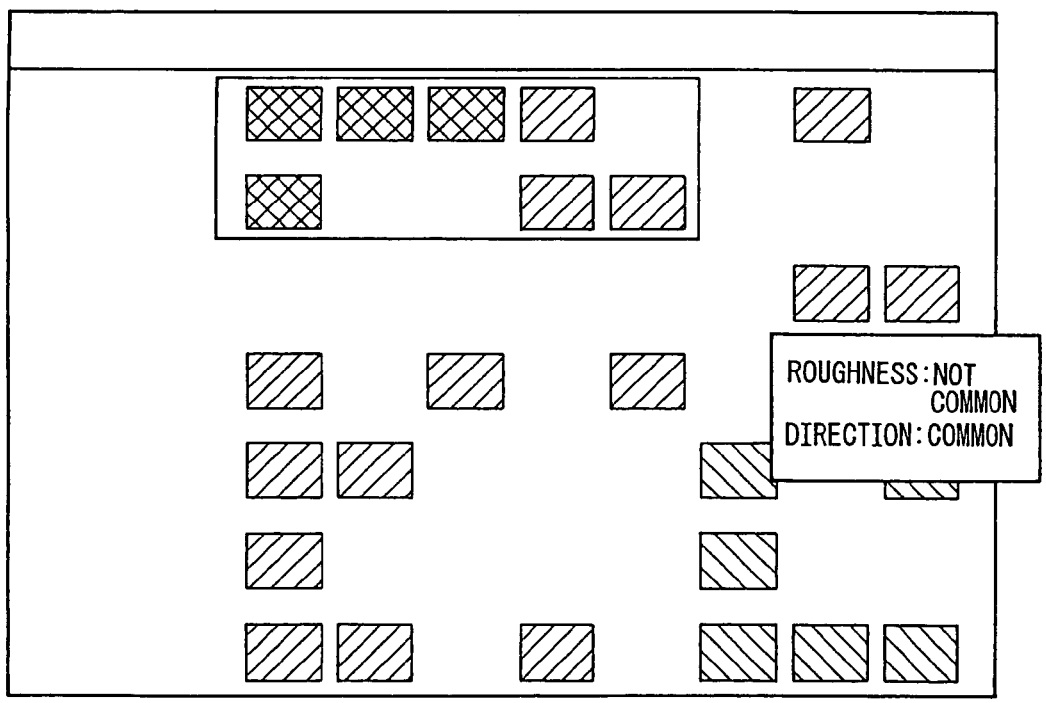
FIG. 11 is a view of a screen where common words are extracted by a user in the specific example of FIG. 4.

FIG. 11 is a view of a screen where common image features are extracted by a user in the specific example shown in FIG. 4.

If using the image features for arrangement, it is possible to extract common factors for example as follows:

The texture feature is used as an image feature to form a self-organizing map.

The learned self organizing map is used to arrange images in a virtual three-dimensional space.

The user views the virtual three-dimensional space and finds locations where images having a certain common property are gathered and locations where they are arranged with regularity. For example, in FIG. 11, images of orange colors are gathered together. The user selects these images surrounded by a yellow frame. As a common feature, components corresponding to the "direction" in the texture feature in a certain range are extracted as candidates of the common feature.

As a rule, "if the direction component of the texture is in a certain range, an orange color is easily carried" can be found.

Next, the relationship verification routine of step S17 of FIG. 4 is executed as follows.

The "relationship between a factor and quality/characteristic" discovered by the user in the above routine is verified. For example, when finding the rule that "when a certain factor is in a specific range, a quality/characteristic tends to fall in a certain range" as this relationship, the method checks whether this rule stands or not for a large amount of data to quantitatively verify the appropriateness of the rule by comparison against the factors, images, or quality/characteristics appearing in the comment. Further, when finding the rule that "a certain factor and quality/characteristic have correlation", it checks to what extent this relationship stands for a large amount of data to quantitatively verify the appropriateness of the relationship found by comparison against the factors, images or quality/characteristic appearing in the comments.

Note that the effects of the present invention can be obtained even if the factors do not include image data converted to numerals/characters or text data converted to numerals/characters.

INDUSTRIAL APPLICABILITY

As clear from the above explanation, if using the method of assisting process analysis of the present invention, the program for making a computer execute that method, or a storage medium storing that program, even when there are few records of data obtained in the production process (corresponding to the number of products or lots), it is possible to repeat the proposal and verification of a hypothesis while incorporating the knowhow and experience of the person performing the analysis and thereby possible to analyze the "relationship between factors and characteristics". Further, in process analysis, it is possible to directly utilize image data expressing the characteristics of the finished product or characteristics of the intermediate product or text data relating to the process such as comments of production workers obtained in the production process.

What is claimed is:

1. A method of assisting analysis of a production process assisting work for analyzing the relationship between factors which may influence the quality of products in a production process and which is comprised of numeral/text data and quality/characteristic of these products, the method of assisting analysis of a production process causing execution of a designation reception routine receiving at least one designation of a factor from a user at a computer, an arrangement routine arranging images corresponding to said image data related to said received factor in a virtual space in said computer, a display routine displaying the virtual space in which said images are arranged in said display device, a routine repeating said designation reception routine, said arrangement routine, and said display routine until the user judges that there is similarity between adjoining images in the displayed images, an image designation reception routine receiving designation of a plurality of images by the user from images having similarity between adjoining images, a common factor extraction routine for automatically extracting a common factor among factors of said designated images, a relation hypothesis reception routine receiving a hypothesis of a relationship between said common factors designated by the user and quality of products, and a routine verifying the relation hypothesis so as to thereby assist work for analyzing the relationship between factors selected by the user and said product characteristic.

2. A method of assisting analysis of a production process as set forth in claim 1, further including a routine extracting from image data expressing a quality/characteristic of said products feature quantity converted to a numeral/character and adding it to one of the factors and a routine extracting from text data relating to the process prepared by a production worker feature quantity converted to a numeral/character and adding it to one of the factors and the common factor extraction routine includes a routine extracting at least one of image features, words, and factors common to a selected image.

3. A method of assisting analysis of a production process as set forth in claim 1, wherein the designated image reception routine includes a routine making a computer receive a specific image designated by a user in said virtual space and said display routine includes a routine making the computer list up and display on said display means images similar to a designated image when a user designates at least one of feature quantity or numeral and word data of a designated image.

4. A method of assisting analysis of a production process as set forth in claim 1, further wherein the routine for verifying a hypothesized relationship includes a routine making the computer verify a relationship between factors and quality/characteristic which a user finds.

5. A method of assisting analysis of a production process as set forth in claim 1, wherein the arrangement routine includes a routine making the computer utilize a self-organizing map.

6. A method of assisting analysis of a production process as set forth in claim 1, wherein the display routine includes a routine making the computer change a viewing point in a virtual space so as to assist the work of viewing images in a virtual space.

7. A method of assisting analysis of a production process as set forth in claim 1, wherein the display routine includes a routine making a computer display a virtual space at a display device connected to another computer through a network.

8. A computer storage medium storing a program product for assisting analysis of a production process assisting work for analyzing the relationship between factors which may influence the quality of products in a production process and which is comprised of numeral/text data and a quality/characteristic of these products, the program product for assisting analysis of a production process causing a computer to execute a designation reception routine receiving at least one designation of a factor from a user, an arrangement routine arranging images corresponding to said image data related to said received factor in a virtual space in a display device connected to said computer, a display routine displaying the virtual space in which said images are arranged in said display device, a routine repeating said designation reception routine, said arrangement routine, and said display routine until the user judges that there is similarity between adjoining images in the displayed images, an image designation reception routine receiving designation of a plurality of images by the user from images having similarity between adjoining images, a common factor extraction routine for automatically extracting a common factor among factors of said designated images, a relation hypothesis reception routine receiving a hypothesis of a relationship between said common factors designated by the user and a quality of a product, and a routine verifying the relation hypothesis so as to thereby assist work for analyzing the relationship between factors selected by the user and said product characteristic.

9. A computer storage medium storing a program product for assisting analysis of a production process as set forth in claim 8, further including a routine making a computer extract from image data expressing quality/characteristic of said products feature quantity converted to a numeral/character and adding it to one of the factors and a routine extracting from text data relating to the process prepared by a production worker feature quantity converted to numeral/character and adding it to one of the factors and the common factor extraction routine includes a routine of extracting at least one of image features, words, and factors common to a selected image.

10. A computer storage medium storing a program product for assisting analysis of a production process as set forth in claim 8, wherein the designated image reception routine includes a routine making a computer receive a specific image designated by a user in said virtual space and said display routine includes a routine making the computer list up and display on said display means images similar to a designated image when a user designates at least one of feature quantity or numeral and character data of a designated image.

11. A computer storage medium storing a program product for assisting analysis of a production process as set forth in claim 8, wherein the routine for verifying a hypothesized relationship includes a routine making the computer verify a relationship between factors and quality/characteristic which a user finds.

12. A computer storage medium storing a program product for assisting analysis of a production process as set forth in claim 8, wherein the arrangement routine includes a routine making the computer utilize a self-organizing map.

13. A computer storage medium storing a program product for assisting analysis of a production process as set forth in claim 8, wherein the display routine includes a routine making a computer change a viewing point in a virtual space so as to assist the work of viewing images in a virtual space.

14. A computer storage medium storing a program product for assisting analysis of a production process as set forth in claim 8, wherein the display routine includes a routine making a computer display a virtual space at a display device connected to another computer through a network.

15. A computer executing a program for assisting analysis of a production process assisting work for analyzing the relationship between factors which may influence the quality of products in a production process and which is comprised of numeral/text data and a quality/characteristic of these products, the program for assisting analysis of a production process causing said computer to execute a designation reception routine receiving at least one designation of a factor from a user, an arrangement routine arranging images corresponding to said image data related to said received factor in a virtual space in a display device connected to said computer, a display routine displaying the virtual space in which said images are arranged in said display device, a routine repeating said designation reception routine, said arrangement routine, and said display routine until the user judges that there is similarity between adjoining images in the displayed images, an image designation reception routine receiving designation of a plurality of images by the user from images having similarity between adjoining images, a common factor extraction routine for automatically extracting common factors among factors of said designated images, a relation hypothesis reception routine receiving a hypothesis of a relationship between said common factors designated by the user and quality of products, and a routine verifying the relation hypothesis so as to thereby assist work for analyzing the relationship between factors selected by the user and said product characteristic.

16. A computer as set forth in claim 15, further including a routine for making said computer extract from image data expressing a quality/characteristic of said products quantity converted to a numeral/character and adding it to one of the factors and a routine for extracting from text data relating to the process prepared by a production worker feature quantity converted to a numeral/character and adding it to one of the factors and the common factor extraction routine includes a routine of extracting at least one of image features, words, and factors common to a selected image.

17. A computer as set forth in claim 16, wherein the designated image reception routine includes a routine making said computer receive a specific image designated by a user in said virtual space and said display routine includes a routine making a computer list up and display on said display means images similar to a designated image when a user designates at least one of feature quantity or numeral and word data of a designated image.

18. A computer as set forth in claim 15, further wherein the routine for verifying a hypothesized relationship includes a routine making the computer verify a relationship between a factor and quality/characteristic which a user finds.

19. A computer as set forth in claim 15, wherein the arrangement routine includes a routine making the computer utilize a self-organizing map.

20. A computer as set forth in claim 15, wherein the display routine includes a routine making said computer change a viewing point in the virtual space so as to assist the work of viewing images in the virtual space.

21. A computer as set forth in claim 15, wherein the display routine includes a routine making said computer display the virtual space at a display device connected to another computer through a network.

* * * * *